US006400699B1

(12) United States Patent
Airy et al.

(10) Patent No.: US 6,400,699 B1
(45) Date of Patent: Jun. 4, 2002

(54) TRANSMISSION SCHEDULER FOR A MULTIPLE ANTENNA WIRELESS CELLULAR NETWORK

(75) Inventors: Manish Airy, San Jose; Baraa Al-Dabagh, Sunnyvale; Jose Tellado, Stanford; Partho Mishra, Cupertino; John Fan, Palo Alto; Peroor K. Sebastian, Mountain View; Arogyaswami J. Paulraj, Stanford, all of CA (US)

(73) Assignee: Iospan Wireless, Inc., San Jose, CA (US)

( * ) Notice: Subject to any disclaimer, the term of this patent is extended or adjusted under 35 U.S.C. 154(b) by 38 days.

(21) Appl. No.: 09/660,246

(22) Filed: Sep. 12, 2000

(51) Int. Cl.[7] ................................................. H04Q 7/00
(52) U.S. Cl. ..................... 370/329; 370/334; 370/474
(58) Field of Search ............................... 370/310, 310.1, 370/310.2, 311, 328, 329–348, 468, 369, 370–375, 474

(56) References Cited

U.S. PATENT DOCUMENTS

| | | | | |
|---|---|---|---|---|
| 5,128,959 A | * | 7/1992 | Bruckert | ........................ 375/1 |
| 5,513,183 A | * | 4/1996 | Kay et al. | .................. 370/95.3 |
| 5,742,592 A | * | 4/1998 | Scholefield et al. | ........ 370/329 |
| 5,815,488 A | | 9/1998 | Williams et al. | |
| 5,818,829 A | * | 10/1998 | Raith et al. | .................. 370/347 |
| 5,933,421 A | | 8/1999 | Alamouti et al. | |
| 5,970,062 A | * | 10/1999 | Bauchot | ..................... 370/345 |
| 6,058,105 A | | 5/2000 | Hochwald | |
| 6,064,662 A | | 5/2000 | Gitlin et al. | |
| 6,081,536 A | * | 6/2000 | Gorsuch et al. | ............. 370/468 |
| 6,097,771 A | | 8/2000 | Foschini | |
| 6,144,711 A | | 11/2000 | Raleigh et al. | |
| 6,192,026 B1 | | 2/2001 | Pollack et al. | |
| 6,236,656 B1 | * | 5/2001 | Westerberg et al. | ........ 370/329 |
| 6,317,435 B1 | * | 11/2001 | Tiedemann, Jr. et al. | ... 370/441 |

FOREIGN PATENT DOCUMENTS

| | | |
|---|---|---|
| WO | 98/09385 | 3/1998 |
| WO | WO98/09381 | 5/1998 |
| WO | 00/79722 | 12/2000 |

OTHER PUBLICATIONS

Paulraj, A., *Taxonomy of space–time processing for wireless networks*, IEE Proc—Radar Sonar navig., vol. 145, No. 1, Feb. 1998.

* cited by examiner

*Primary Examiner*—David Vincent
(74) *Attorney, Agent, or Firm*—Brian R. Short

(57) ABSTRACT

The invention includes an apparatus and method for scheduling wireless transmission of data blocks between at least one antenna of a base transceiver station and multiple subscriber units. The scheduling can be based on the quality of a transmission link between the base station antennas and the subscriber units, the amount of data requested by the subscriber units, and/or the type of data requested by the subscriber units. The scheduling generally includes assigning frequency blocks and time slots to each of the subscriber units for receiving or transmitting data blocks. The invention includes a method for transmitting data streams between a base transceiver station and a plurality of subscribers. The method includes receiving protocol data units from a network, creating sub-protocol data units from the protocol data units, and once per a frame of time, generating a schedule that designates time slots and pre-defined frequency blocks in which each one of the plurality of subscribers is to receive each of the sub-protocol data units from a plurality of base station transceiver antennas. The invention can further include transmitting the schedule to each of the subscribers, and the plurality of base station transceiver antennas transmitting the sub-protocol data units according to the schedule. The invention can further include selecting at least one transmission mode for each subscriber. The transmission mode dictating the type of modulation and/or coding used during transmission of the sub-protocol data units.

33 Claims, 15 Drawing Sheets

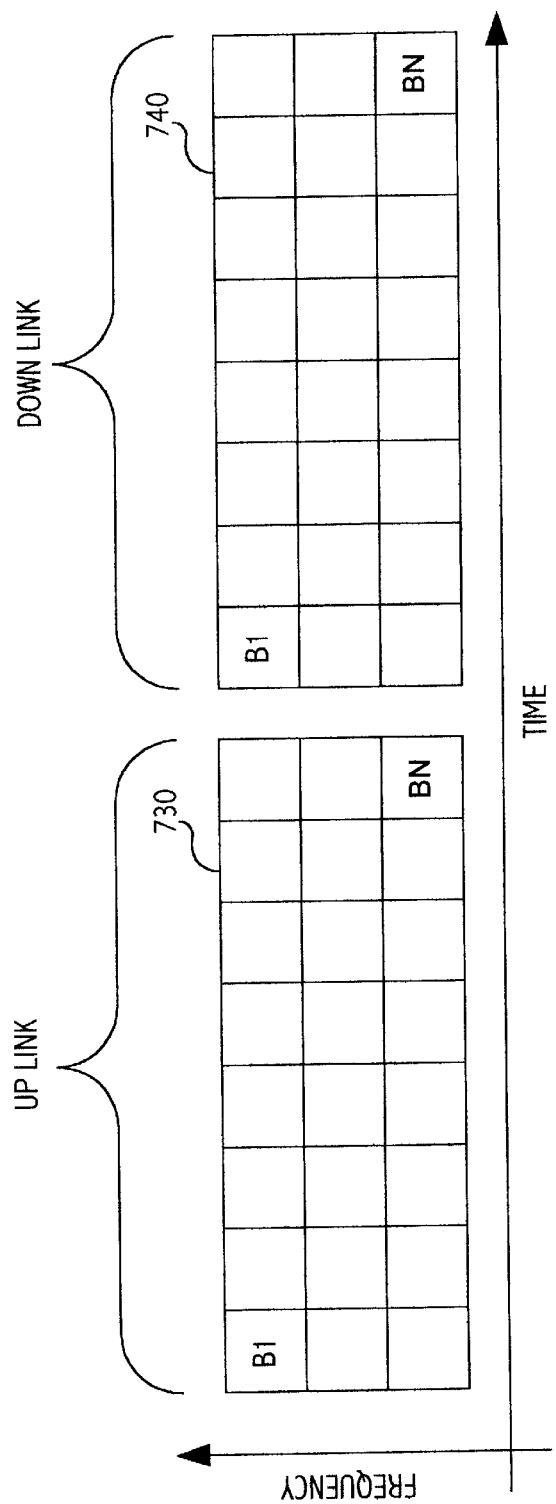

TRANSMISSION SCHEDULER FOR A MULTIPLE ANTENNA WIRELESS CELLULAR NETWORK

FIELD OF THE INVENTION

The invention relates generally to wireless communications. More particularly, the invention relates to scheduling of data wirelessly transmitted between a base control station having multiple antennas, and subscriber units.

BACKGROUND OF THE INVENTION

Wireless communication systems commonly include information carrying modulated carrier signals that are wirelessly transmitted from a transmission source (for example, a base transceiver station) to one or more subscribers (for example, subscriber units) within an area or region.

SPATIAL MULTIPLEXING

Spatial multiplexing is a transmission technology that exploits multiple antennae at both the base transceiver station and at the subscriber units to increase the bit rate in a wireless radio link with no additional power or bandwidth consumption. Under certain conditions, spatial multiplexing offers a linear increase in spectrum efficiency with the number of antennae. The substreams occupy the same channel of a multiple access protocol, the same time slot in a time-division multiple access protocol, the same frequency slot in frequency-division multiple access protocol, the same code sequence in code-division multiple access protocol or the same spatial target location in space-division multiple access protocol. The substreams are applied separately to the transmit antennae and transmitted through a radio channel. Due to the presence of various scattering objects in the environment, each signal experiences multipath propagation.

The composite signals resulting from the transmission are finally captured by an array of receiving antennae with random phase and amplitudes. At the subscriber array, a spatial signature of each of the received signals is estimated. Based on the spatial signatures, a signal processing technique is applied to separate the signals, recovering the original substreams.

FIG. 1 shows three transmitter antenna arrays 110, 120, 130. The transmitter antenna arrays 110, 120, 130 transmit data symbols to a subscriber antenna array 140. Each transmitter antenna array includes spatially separate antennae. A subscriber connected to the subscriber antenna array 140 separates the received signals.

FIG. 2 shows modulated carrier signals traveling from a transmitter 210 to a subscriber 220 following many different (multiple) transmission paths.

Multipath can include a composition of a primary signal plus duplicate or echoed images caused by reflections of signals off objects between the transmitter and subscriber. The subscriber may receive the primary signal sent by the transmitter, but also receives secondary signals that are reflected off objects located in the signal path. The reflected signals arrive at the subscriber later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several microseconds.

The multiple paths traveled by the modulated carrier signal typically results in fading of the modulated carrier signal. Fading causes the modulated carrier signal to attenuate in amplitude when multiple paths subtractively combine.

COMMUNICATION DIVERSITY

Antenna diversity is a technique used in multiple antenna-based communication system to reduce the effects of multipath fading. Antenna diversity can be obtained by providing a transmitter and/or a subscriber with two or more antennae. These multiple antennae imply multiple channels that suffer from fading in a statistically independent manner. Therefore, when one channel is fading due to the destructive effects of multipath interference, another of the channels is unlikely to be suffering from fading simultaneously. By virtue of the redundancy provided by these independent channels, a subscriber can often reduce the detrimental effects of fading.

Wireless systems generally require scheduling of information transmitted between base transceiver stations and subscriber units. The bandwidth of the available transmission frequencies is limited. Therefore, the transmission between multiple transceiver stations and subscriber units generally requires time, frequency, or some other type of multiplexing. The larger the number of base station transceivers and subscriber units, the more complex the scheduling. Additionally, the above-described spatial multiplexing and communication diversity add complexity to the scheduling.

An individual transmission link exists between each individual base transceiver station antenna and a subscriber unit in communication with the base transceiver station. The previously described spatial multiplexing and communication diversity require multiple antennas to each have transmission links with a single subscriber unit. Optimally, the base transceiver station can schedule data transmission according to the transmission link quality between each base transceiver station antenna the subscriber unit. That is, the amount of information that can be transmitted between the individual base transceiver station antennas and the subscriber unit is base upon the quality of the transmission links. Ideally, the scheduling of the transmission of information between the base station transceiver and the subscriber units is dependent upon the quality of the individual transmission links.

It is desirable to have an apparatus and method that provides scheduling of transmission of data blocks between base station transceiver antennas and subscribers (subscriber) units. It is desirable that the scheduling be adaptive to the quality of transmission links between the base station transceiver antennas and each of the subscribers (subscriber) units. It is additionally desirable that the apparatus and method allow for spatial multiplexing and communication diversity.

SUMMARY OF THE INVENTION

The invention includes an apparatus and a method for scheduling wireless transmission of data blocks between at least one antenna of a base transceiver station and multiple subscriber units. The scheduling can be based on the quality of a transmission link between the base station antennas and the subscriber units, the amount of data requested by the subscriber units, and/or the type of data requested by the subscriber units. The scheduling generally includes assigning frequency blocks and time slots to each of the subscriber units for receiving or transmitting data blocks.

A first embodiment of the invention includes a method for transmitting data streams between a base transceiver station and a plurality of subscribers. The method includes receiving protocol data units from a network, creating sub-protocol data units from the protocol data units, and once per a frame of time, generating a schedule that designates time slots and pre-defined frequency blocks in which each one of the plurality of subscribers is to receive each of the sub-protocol data units from a plurality of base station transceiver antennas.

A second embodiment of the invention is similar to the first embodiment. The second embodiment further includes transmitting the schedule to each of the subscribers, and the plurality of base station transceiver antennas transmitting the sub-protocol data units according to the schedule.

A third embodiment is similar to the second embodiment. The third embodiment includes selecting at least one transmission mode for each subscriber. The transmission mode dictating the type of modulation and/or coding used during transmission of the sub-protocol data units. The transmission mode selection can be dependent upon a quality of transmission link between the base station transceiver and the subscribers, and/or a quality of service requested by the subscribers.

A fourth embodiment is similar to the first embodiment. For the third embodiment, generating a schedule that designates time slots and pre-defined frequency blocks includes receiving service flow requests from the subscribers. The service flow requests indicating demands for data by the subscribers. Generating a schedule can further include receiving an information size request from the subscribers, and/or receiving a block weight for each of the service flow requests, wherein the block weight is dependent upon a priority of each of the service flow request. The block weight determines how many consecutive time slots and frequency blocks are transmitted to each subscriber.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7C shows a frame structure that include an up link map transmitted at a first time, and a down link map transmitted at a second time.

FIG. 8 shows an example of a service flow table.

DETAILED DESCRIPTION

Figure 1:
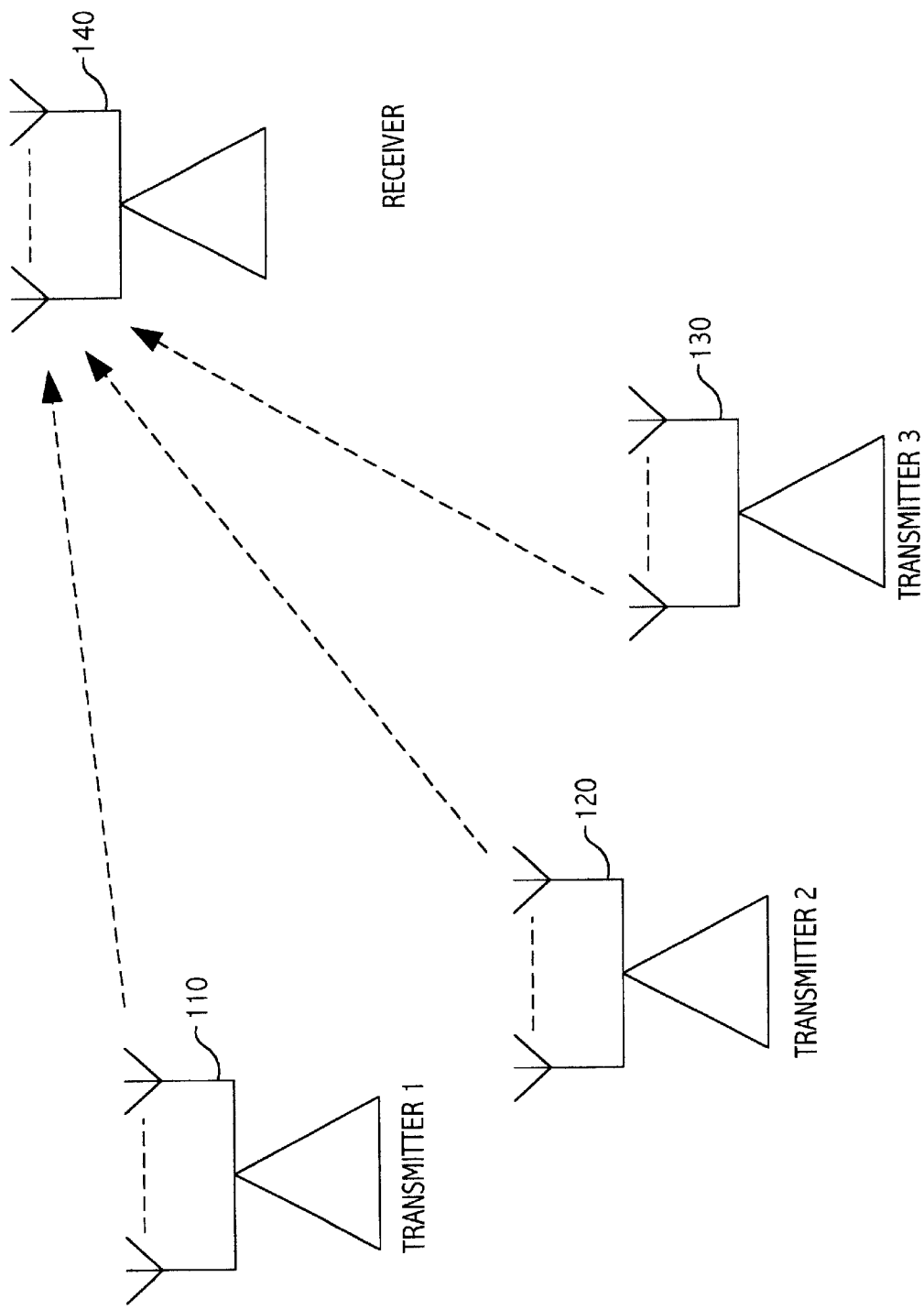
FIG. 1 shows a prior art wireless system that includes spatially separate transmitters.
Figure 2:
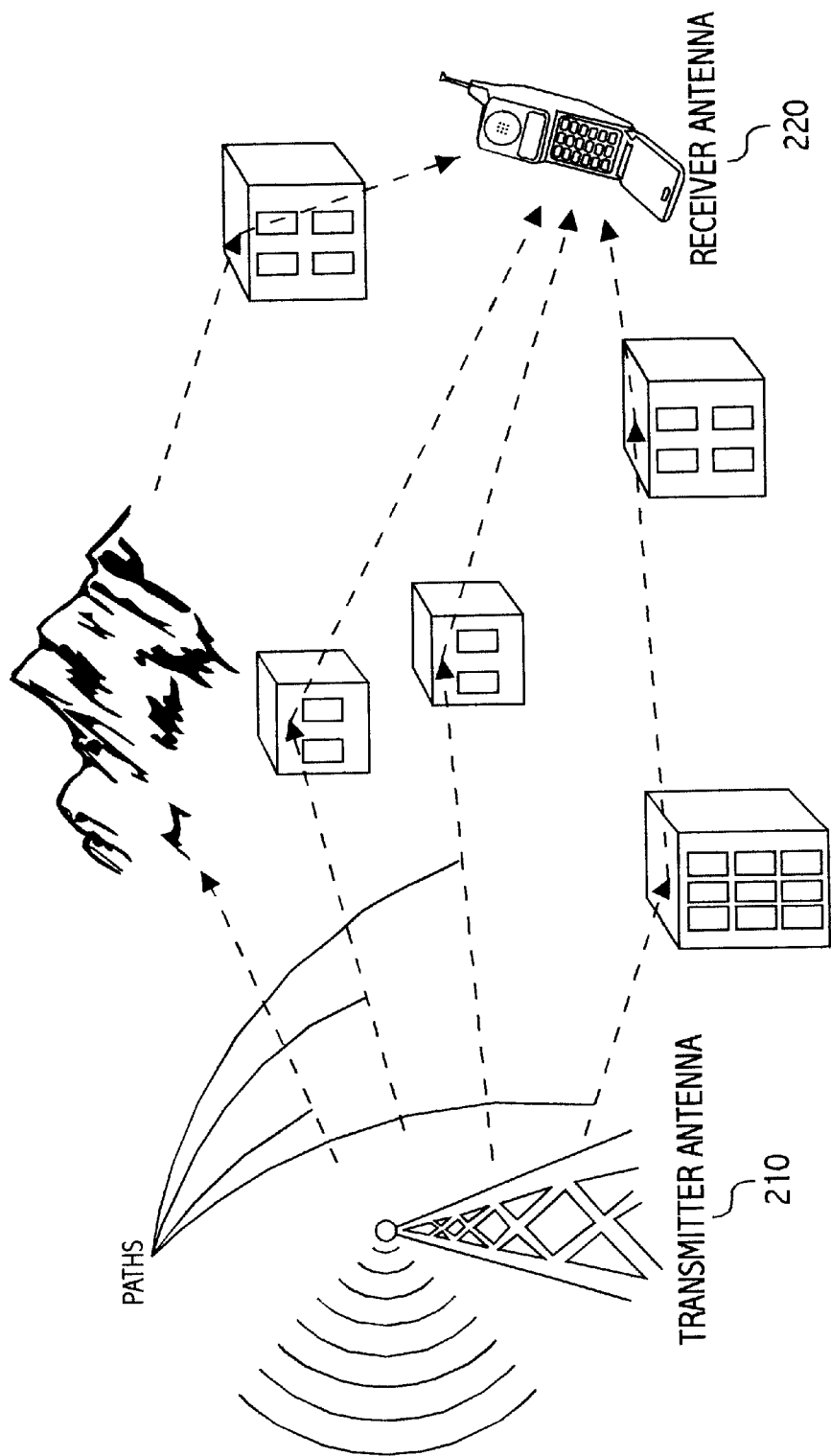
FIG. 2 shows a prior art wireless system that includes multiple paths from a system transmitter to system subscriber.

As shown in the drawings for purposes of illustration, the invention is embodied in an apparatus and a method for scheduling wireless transmission of data blocks between at least one antenna of a base transceiver station and multiple subscriber units. The scheduling can be based on the quality of a transmission link between the base station antennas and the subscriber units, the amount of data requested by the subscriber units, and/or the type of data requested by the subscriber units. The scheduling generally includes assigning frequency blocks and time slots to each of the subscriber units for receiving or transmitting data blocks.

As previously described, the invention includes wireless communication between at least one base transceiver station and subscriber units. The communications is two-way. That is, information is transmitted from the base transceiver station to the subscriber units (down link transmission), and information is transmitted from the subscriber units to the base transceiver station (up link transmission).

The transmission can be time division duplex (TDD). That is, the down link transmission can occupy the same channel (same transmission frequency) as the up link transmission, but occur at different times. Alternatively, the transmission can be frequency division duplex (FDD). That is, the down link transmission can be at a different frequency than the up link transmission. FDD allows down link transmission and up link transmission to occur simultaneously. The following discussion of the invention generally includes FDD. However, it should be understood that a TDD implementation is feasible.

As previously discussed, multiple subscriber units are in communication with at least once base transceiver station antenna. Multi-point wireless communication systems like this, can include time division multiplexing (TDM), frequency division multiplexing (FDM), code division multiplexing (CDM), spatial division multiplexing (SDM), or any combination thereof, for communicating with multiple units. The following discussion of the invention includes a TDM-FDM combination. However, it is to be understood that other combinations of the above describe multiplexing schemes can be implemented.

Figure 3:
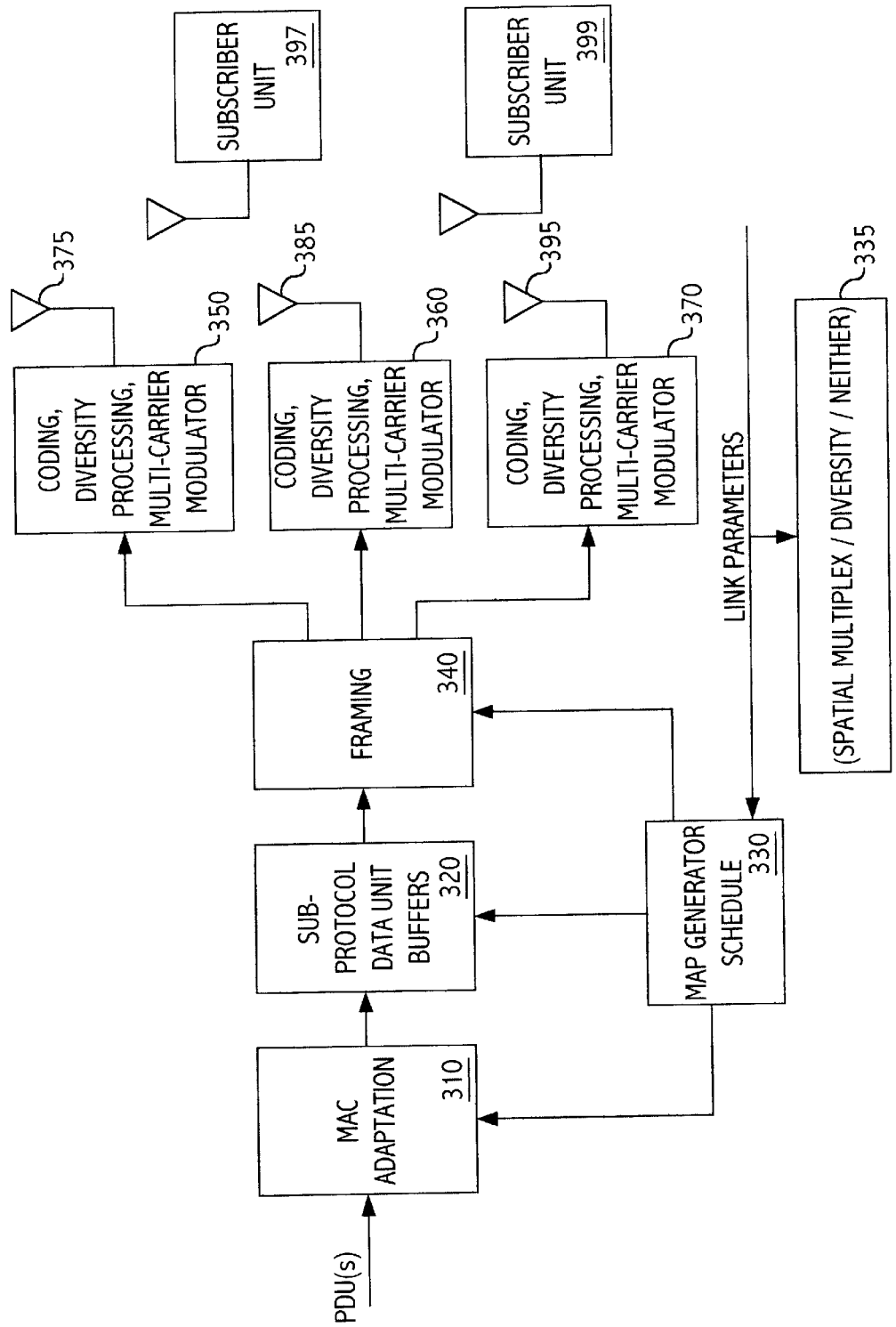
FIG. 3 shows an embodiment of the invention.

FIG. 3 shows an embodiment of the invention. The embodiment includes a base station transceiver receiving standard protocol data units (PDU's). The PDU's are divided into smaller sub-protocol data units that are stored in memory. A schedule is generated that designates time slots and frequency blocks in which the sub-protocol data units are to be transmitted to each of the subscriber units, and time slots and frequency blocks in which other sub-protocol data units are to be transmitted from the subscriber units to the base station transceiver.

A media access control (MAC) adaptation unit 310 receives the protocol data units from a standard computer network. The protocol data units can be Ethernet or ATM frames, or Internet protocol (IP) or frame relay packets. The MAC adaptation unit 310 divides the protocol data units into smaller sub-protocol data units that are more adaptable for transmission within wireless communication systems. The smaller sub-protocol data units facilitate more efficient error recovery through retransmission. Wireless channels tend to vary often. The smaller size of the sub-protocol data units makes it more likely that the data units will experience a steady channel during transmission.

The digital circuitry or software required to divide or break large groups of data into smaller groups of data is well known in the art of digital circuit and software design.

The sub-protocol data units are stored within sub-protocol data buffers 320. The sub-protocol data buffers 320 provide a scheduler 330 with easy access to the sub-protocol data.

The scheduler 330 generates a map or schedule of when the sub-protocol data units are to be transmitted, which sub-protocol data units are to be received by which subscriber unit, and when and at what frequency band the subscriber units can transmit sub-protocol data units back to the base station transceiver. The map is transmitted to the subscriber units so that each subscriber unit knows when to receive and transmit sub-protocol units. A map is transmitted once per unit of time. The unit of time is generally referred to as a frame. The time duration of a frame is variable.

The scheduler 330 receives information regarding the quality of transmission links between the base station transceiver and the subscriber units. The quality of the links can be used to determine whether the transmission of data should include spatial multiplexing or communication diversity. Additionally, the scheduler 330 receives data requests from the subscriber units. The data requests include information regarding the size and data type of data to be transmitted. The scheduler utilizes the link quality information, the data size, and the data type (including priority and requisite quality of service (QoS)) for generating the schedule. A detailed discussion of an implementation of the scheduler will follow.

A spatial multiplexing/diversity/neither block 335 has been included within FIG. 3. The spatial multiplexing/diversity/neither block 335 is included to show that a decision is made whether to include spatial multiplexing or diversity based upon the quality of the transmission link parameters between the base transceiver station and a subscriber unit. The decision process can be located within the scheduler 330 or even within the subscriber unit.

The scheduling decisions that are based upon the transmission quality between a base transceiver station and subscriber unit can be made at either the base station transceiver or the subscriber unit. The scheduling decisions can be made for both down link transmission and up link transmission. It is essential that both the base transceiver station and the subscriber unit be aware of the scheduling, spatial multiplexing and diversity decisions that are made base upon the quality of the transmission link.

The scheduler 330 accesses the sub-protocol data units within the sub-protocol data buffers 320. Each data request can have a dedicated buffer within the sub-protocol data buffers 320. A predetermined number of sub-protocol data units are retrieved by the scheduler 330 and ordered within a frame within a framing unit 340. A map of the schedule is included within every frame for the purpose of indicating to each subscriber unit when (that is, which time slot) and at what frequency data blocks requested by the subscriber unit will be transmitted, and when and at what frequency data blocks can be transmitted from the subscriber unit. The frame includes a predetermined number of sub-protocol data units as will be described later. An implementation of the framing unit 340 will be discussed later.

The framed sub-protocol data units are received by coding, diversity processing, multi-carrier modulation units 350, 360, 370. The coding within the units 350, 360, 370 will be discussed later. The units 350, 360, 370 can include diversity processing of the sub-protocol units. Diversity communications and processing is well known in the field of communications.

Multi-carrier modulator units 350, 360, 370 each generate a plurality of multiple-carrier modulated signals. Each multi-carrier modulator 350, 360, 370 receives a processed (coding and/or diversity processing) sub-protocol data unit stream and generates a multiple-carrier modulated signal based on the corresponding processed sub-protocol data unit stream. The multiple-carrier modulated signals are frequency up-converted and amplified as is well known in the art of communication systems.

An output of a first multi-carrier modulator 350 is connected to a first transmit antenna 375. An output of a second multi-carrier modulator 360 is connected to a second transmit antenna 385. An output of a third multi-carrier modulator 370 is connected to a third transmit antenna 395. The first transmit antenna 375, the second transmit antenna 385, and the third transmit antenna 395 can be located within an antenna array at a single base station. Alternatively, the first transmit antenna 375, the second transmit antenna 385, and the third transmit antenna 395 can each be located at separate base stations. The first transmit antenna 375, the second transmit antenna 385, and the third transmit antenna 395 can have different polarization states, and be either physically co-located at a single base station, or each located at separate base stations. Circuitry associated with the transmit chains can be separately located with the antennas 375, 385, 395.

The embodiment of FIG. 3 includes three transmit antennas. It is to be understood that the invention can include two or more transmit antennas. The additional antennas can be driven by additional multi-carrier modulators that each include separate corresponding processed sub-protocol data unit streams.

The embodiment of FIG. 3 can further include subscribers units 397, 399. The subscribers units 397, 399 can include multiple spatially separate subscriber antennae.

Multiple transmitter antennae and multiple subscriber antennae allow the wireless communication system to include spatial multiplexing and communication diversity. As described earlier, spatial multiplexing and communication diversity can improve the capacity of the communication system and reduce the effects of fading and multi-path resulting in increased capacity.

The scheduler 330 can support the processing required for spatial multiplexing. That is, the scheduler can direct sub-protocol data units to be transmitted from multiple base transceiver antennae (single base or multiple bases) so that transmission to a particular subscriber unit includes spatial multiplexing. For spatial multiplexing, more sub-protocol data units are scheduled for transmission. The number of sub-protocol data units scheduled for transmission is dependent upon the spatial multiplexing order.

Radio Frequency (RF) signals are coupled between the transmitter antennae and the subscriber antennae. The RF signals are modulated with data streams comprising the transmitted symbols. The signals transmitted from the transmitter antennae can be formed from different data streams (spatial multiplexing) or from one data stream (communication diversity) or both.

Down Link Transmission

Figure 4A:
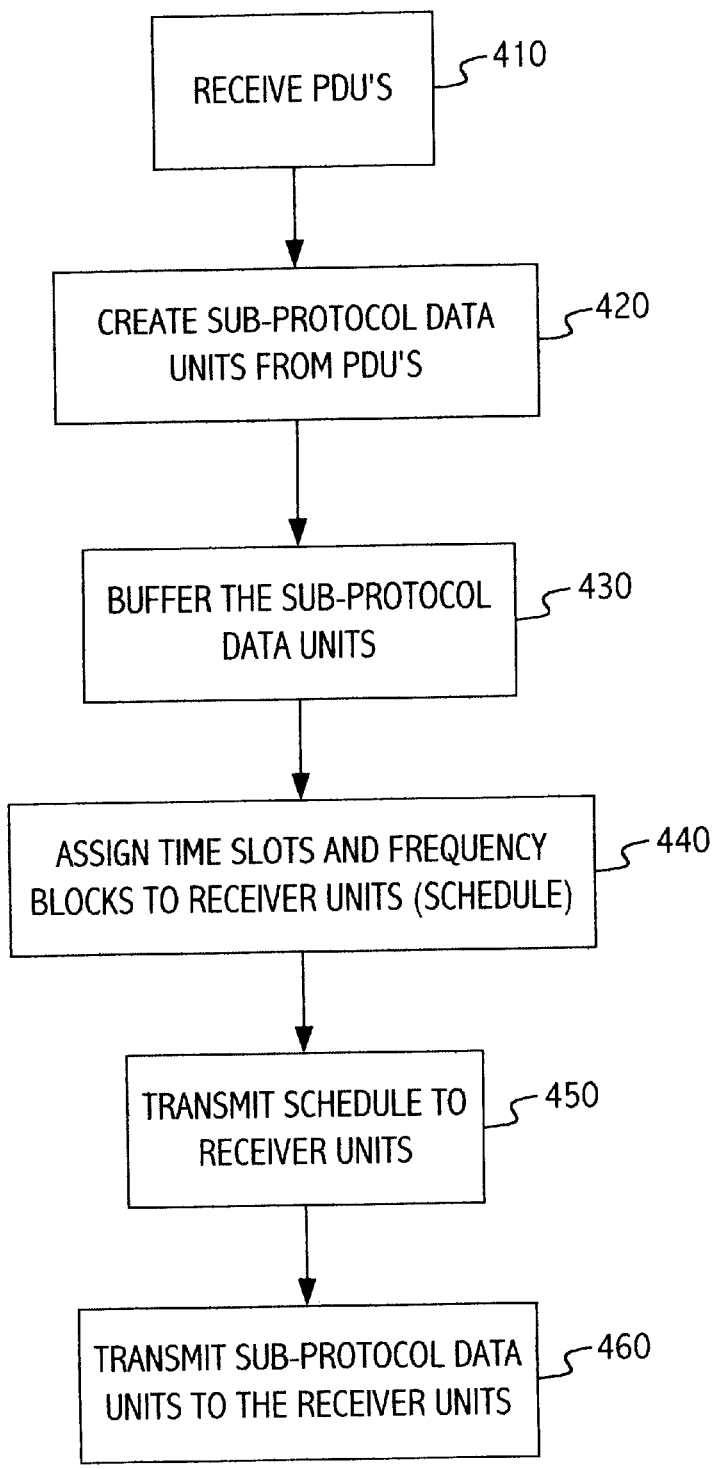
FIG. 4A shows a flow chart of steps included within an embodiment of the invention.

FIG. 4A shows a flow chart of steps included within an embodiment of the invention. A first step 410 includes receiving the PUD's. A second step 420 includes creating sub-protocol data units from the PUD's. A third step 430 includes storing the sub-protocol data units in sub-protocol data unit buffers. A fourth step 440 includes scheduling time slots and frequency block to each of the subscriber units. A fifth step 450 includes transmitting the schedule to the subscriber units. A sixth step 460 includes transmitting the sub-protocol data units to the subscribers. It is to be understood that the steps of the flow chart of FIG. 4A are not necessarily sequential.

Up Link Transmission

Figure 4B:
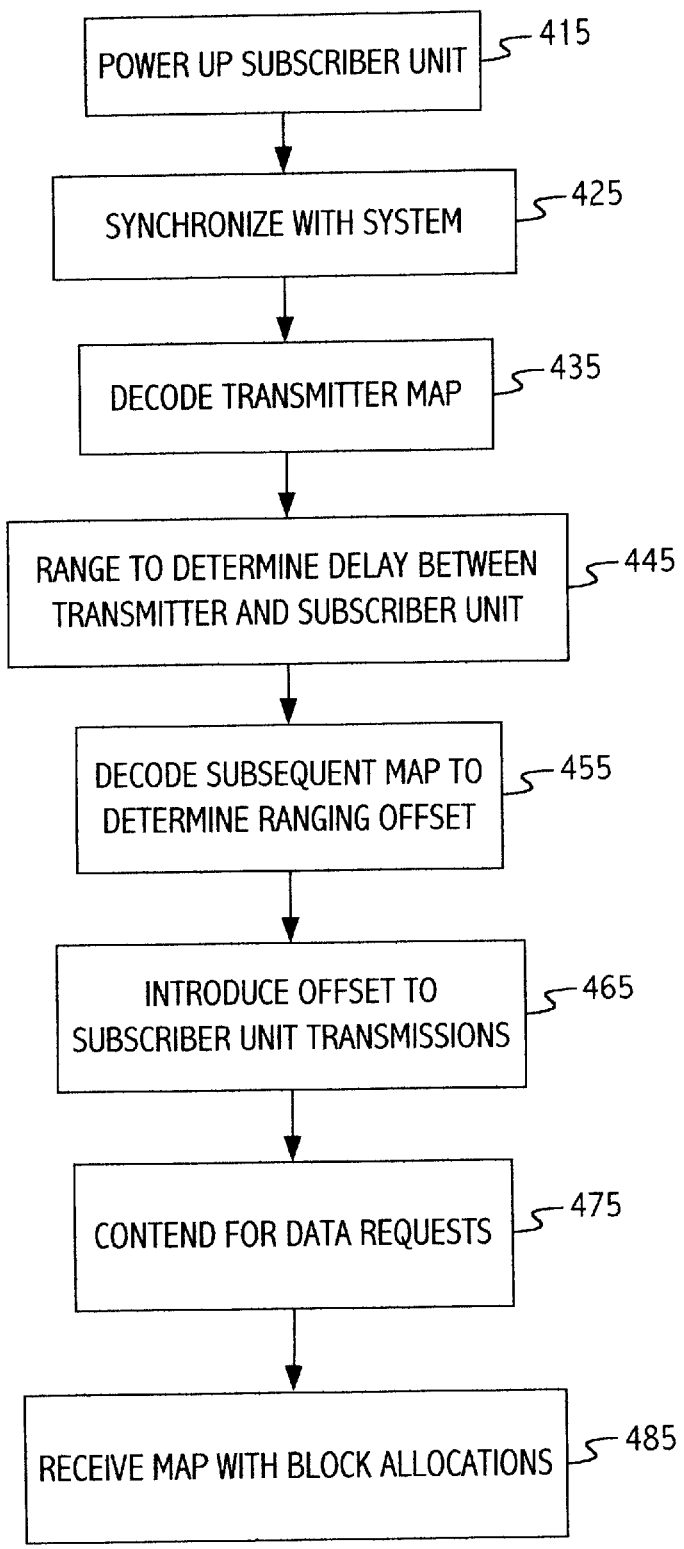
FIG. 4B show another flow chart of steps included within another embodiment of the invention.

FIG. 4B show another flow chart of steps included within another embodiment of the invention. This embodiment includes the up link transmission procedures.

A first step 415 includes powering up a subscriber unit.

A second step 425 includes synchronizing the subscriber unit with frames being transmitted being transmitted from a base transceiver station. The base transceiver station transmits information within the frames that allows the subscriber units to phase-lock or synchronize with the base transceiver station. Generally, all base transceiver stations of a cellular system are synchronized with a common reference clock signal.

A third step 425 includes decoding a map transmitted within the base transceiver station. The transmitted map allows identification of ranging blocks and contention blocks that the subscriber can use for transmitting information to the base transceiver station.

A fourth step 445 includes the subscriber unit sending ranging information. The ranging information is sent for estimating the propagation delay between the subscriber unit and the base transceiver station. The estimated delay is used for ensuring that transmit timing of the subscriber unit is adjusted to compensate for the propagation delay.

A fifth step 455 includes decoding a map that is subsequently sent by the base transceiver station for determining a ranging offset. The ranging offset can be used for future transmission by the subscriber unit.

A sixth step 465 includes introducing the ranging offset in future subscriber unit transmissions.

A seventh step 475 includes contending for data requests with other subscriber units.

An eighth step 485 includes receiving a map with block allocations in which data requests (up link) can be sent by the subscriber unit to the base transceiver station.

Service Flows

A service flow request represents a bidirectional demand for data (up stream and down stream) between a base transceiver station and a subscriber unit, with an associated set of quality of service parameters. Generally, there are two types of service flow requests, constant bit rate (CBR) and unrestricted bit rate (UBR).

The CBR service flow requests include the scheduler scheduling the subscribers to receive or transmit sub-protocol data units periodically. The period can be a predetermined number of times per frame. Once a service flow request is made, the up link and down link bandwidth allocation is periodic. Information is transmitted to and from the subscriber units without the subscriber units having to send information size requests. Up link allocations are periodically scheduled without solicitation by the subscriber unit.

The UBR service flow requests include the scheduler scheduling the up link and down link scheduling based upon information size requests by the subscribers. The down link map allocations are made based upon the amount of data in the associated service flow buffers. The up link map allocations are made based upon the information size requests sent by the subscriber units. Each information size request updates the scheduler estimate of the amount of data in an associated service flow buffer.

Down Link Service Flow Request

Figure 5A:
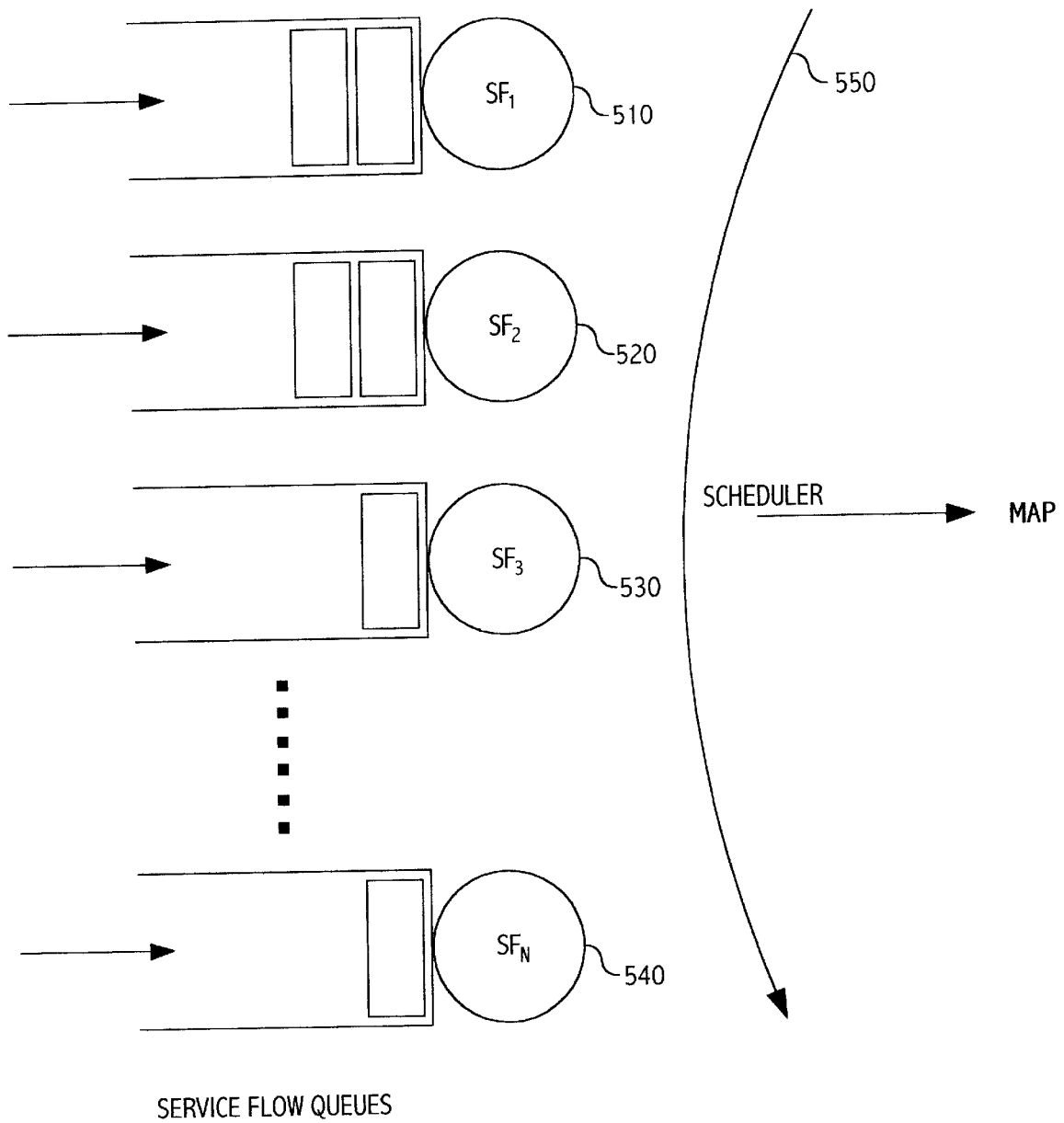
FIG. 5A shows a set of service flow requests that indicate demands for data by subscriber units.

FIG. 5A shows a set of service flow buffers 510, 520, 530, 540 that contain sub-protocol data units for subscriber units. The scheduler uses the service flow buffers 510, 520, 530, 540 to generate the sub-protocol data transmission schedule. The service flow buffers can contain different sizes of data. The scheduler addresses the service flow buffers, and forms the schedule.

The service flow buffers 510, 520, 530, 540 contain data for the subscriber units. The buffers 510, 520, 530, 540 contain data received from the network generally in response to requests sent from the subscriber units. The buffers 510, 520, 530, 540 are accessible by a processor within the base transceiver station.

The service flow buffers 510, 520, 530, 540 can contain a variety of types, and amounts of data. As will be described later, these factors influence how the scheduler maps the data demanded by the subscriber units.

The scheduler accesses service flow buffers 510, 520, 530, 540, during the generation of the map of the schedule.

As depicted in FIG. 5A by arrow 550, an embodiment of the scheduler includes addressing each service flow sequentially and forming the map of the schedule. As will be described later, the data blocks dedicated to each service flow request is dependent upon a block weight. The block weight is generally dependent upon the priority of the particular demand for data.

Up Link Service Flow Request

Figure 5B:
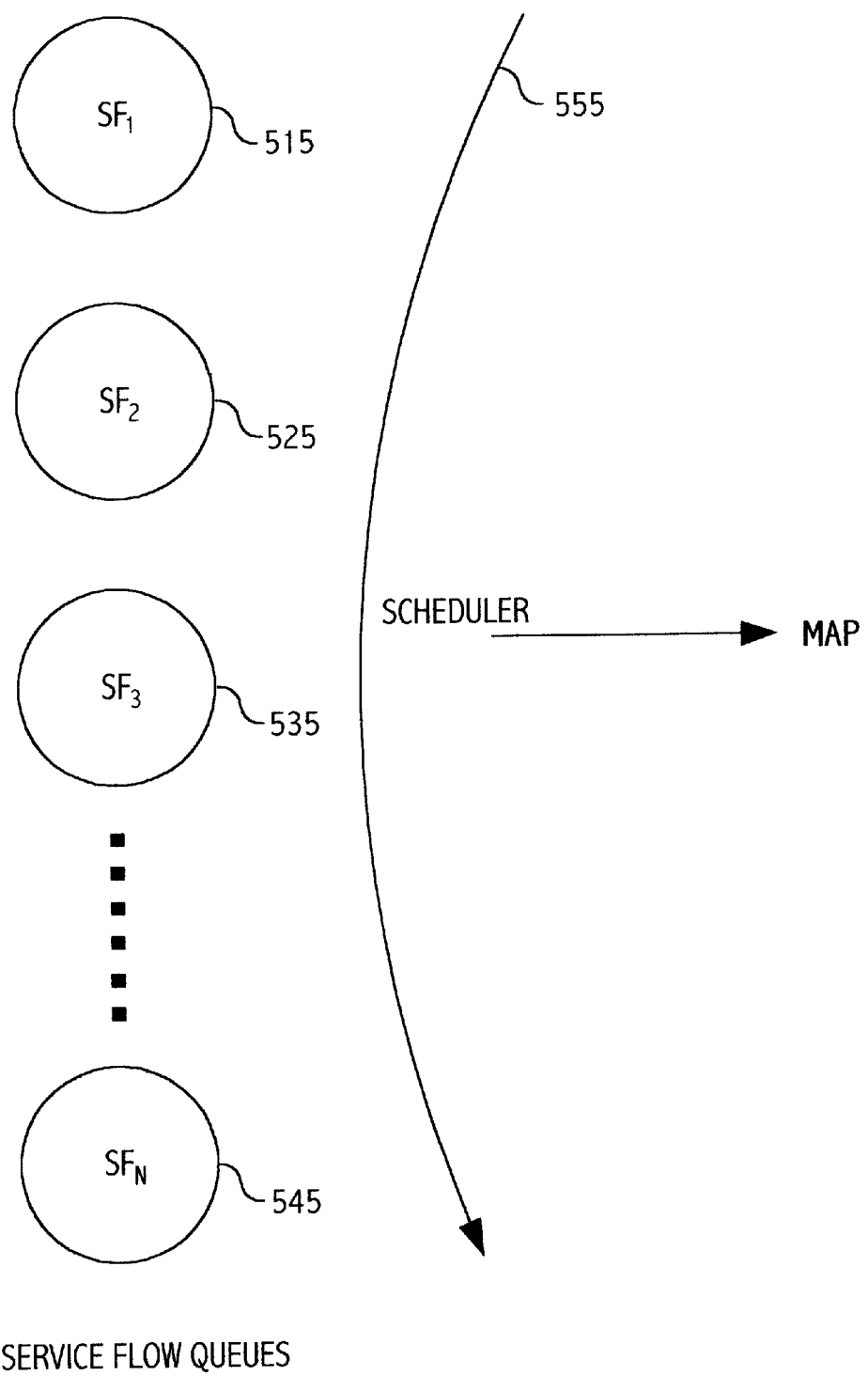
FIG. 5B shows a set of estimated service flow buffer sizes that indicate demands for up link data by subscriber units.

FIG. 5B shows a set of estimated service flow buffer sizes 515, 525, 535, 545 based upon the service flow (CBR, UBR) that indicate demands for up link data by subscriber units. The scheduler uses the estimated service flow buffer sizes 515, 525, 535, 545 to generate the sub-protocol data up link transmission schedule. The scheduler addresses the estimated service flow buffer sizes forming the schedule.

The estimated service flow buffer sizes 515, 525, 535, 545 are estimated demands for data by the subscriber units. The estimated service flow buffer sizes 515, 525, 535, 545 are generally wirelessly received from the subscriber units by the base transceiver station. The estimated service flow buffer sizes 515, 525, 535, 545 can be queued in memory buffers that are accessible by a processor within the base transceiver station.

As depicted in FIG. 5B by arrow 555, an embodiment of the scheduler includes addressing each estimated service flow buffer size sequentially and forming the map of the schedule. As will be described later, the data blocks dedicated to each estimated service buffer size is dependent upon a block weight. The block weight is generally dependent upon the priority of the particular demand for data.

Orthogonal Frequency Division Multiplexing (OFDM) Modulation

Frequency division multiplexing systems include dividing the available frequency bandwidth into multiple data carriers. OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

Figure 6:
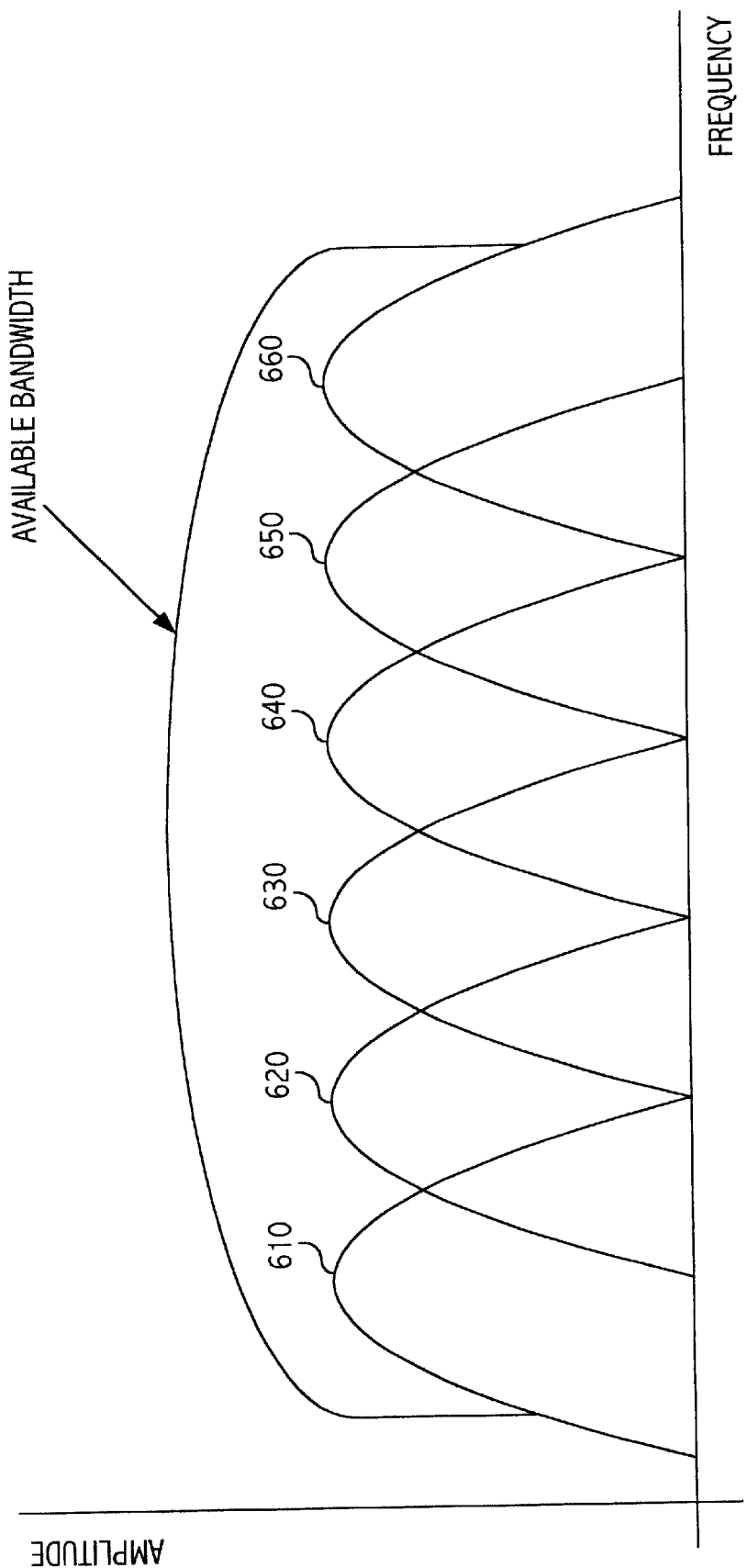
FIG. 6 shows a frequency spectrum of OFDM sub-carrier signals.

FIG. 6 shows a frequency spectrum of OFDM sub-carrier signals 610, 620, 630, 640, 650, 660. Each sub-carrier 610, 620, 630, 640, 650, 660 is modulated by separate symbols or combinations of symbols.

An example OFDM signal occupying 6 MHz is made up of 1024 individual carriers (or tones), each carrying a single QAM symbol per burst. A cyclic prefix or cyclic suffix is used to absorb transients from previous bursts caused by multipath signals. Additionally, the cyclic prefix or cyclic suffix causes the transmit OFDM waveform to look periodic. In general, by the time the cyclic prefix is over, the resulting waveform created by the combining multipath signals is not a function of any samples from the previous burst. Therefore, no ISI occurs. The cyclic prefix must be greater than the delay spread of the multipath signals.

Frame Structure

Figure 7A:
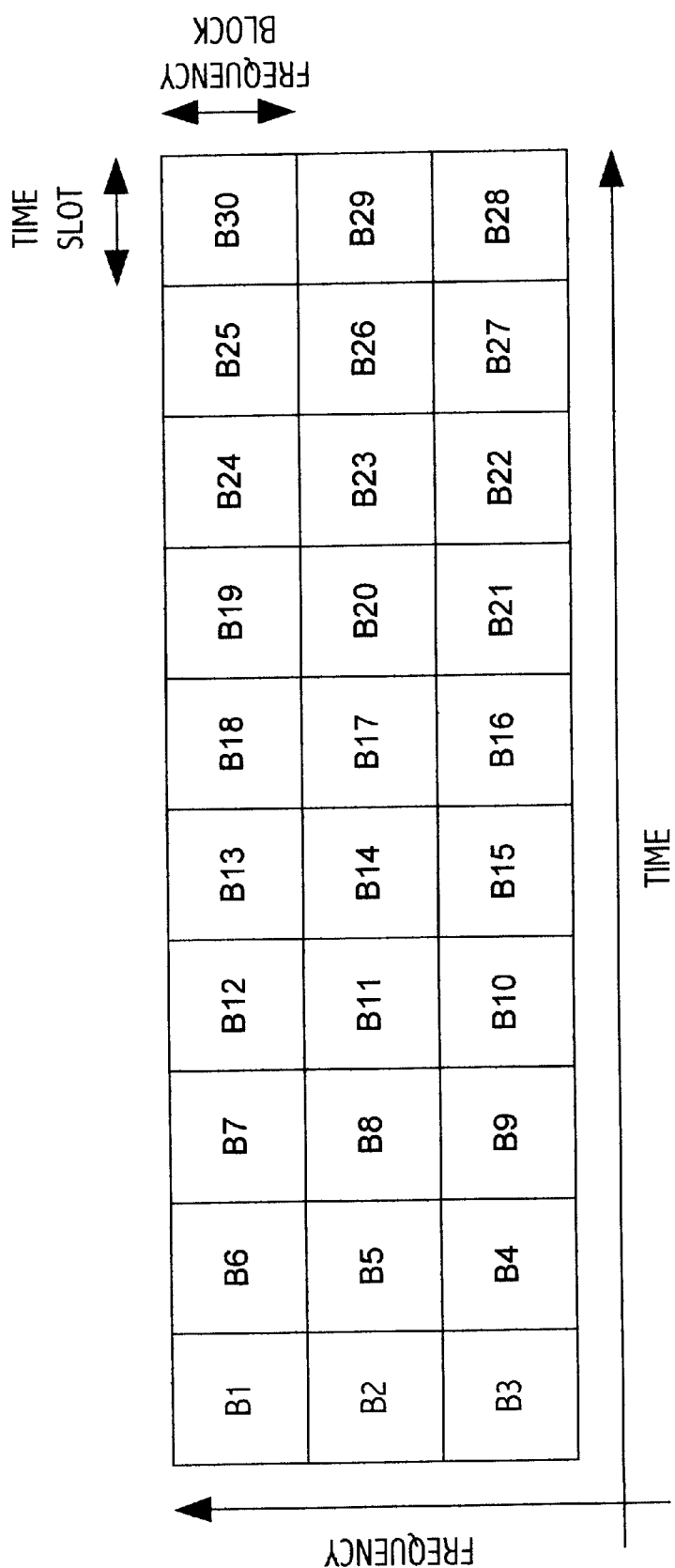
FIG. 7A shows a frame structure depicting blocks of transmission data defined by transmission time and transmission frequency.

FIG. 7A shows a frame structure depicting blocks of transmission data defined by transmission time slots and transmission frequency blocks. The scheduler maps requests to transmit or receive data into such a frame structure. For example, data blocks B1, B2 and B3 can be transmitted during a first time slot, but over different frequency ranges or blocks. Data blocks B4, B5 and B6 are transmitted during a second time slot, but over different frequency ranges or blocks than each other. The different frequency ranges can be defined as different groupings or sets of the above-described OFDM symbols. As depicted in FIG. 7A, the entire transmission frequency range includes three frequency blocks within a frame.

Data blocks B1, B6, B7, B12, B13, B18, B19, B24, B25 and B30 are transmitted over common frequency ranges, but within different time slots. As depicted in FIG. 7A, ten time slots are included within a single frame. The number of time slots per frame is not necessarily fixed.

The numbering of the data blocks is depicted in the order chosen because of ease of implementation.

The data blocks generally occupy a predetermined amount of frequency spectrum and a predetermined amount of time. However, due to the variations in the possible types of modulation, the number of bits transmitted within a block is variable. That is, typically the data blocks include a predetermined number of OFDM symbols. The number of bits within an OFDM symbol is based on the type of modulation used in transmission. That is, a 4 QAM symbol includes fewer bits than a 16 QAM symbol. The number of bits included within a sub-protocol data unit is generally set to a predetermined number.

Additionally, depending upon the quality of the transmission link, the bits to be transmitted can be coded, adding additional bits. Therefore, the number of sub-protocol data units included within a data block is variable. The variability of the number of sub-protocol unit included within a data block will be discussed further when discussing the transmission modes.

Figure 7B:
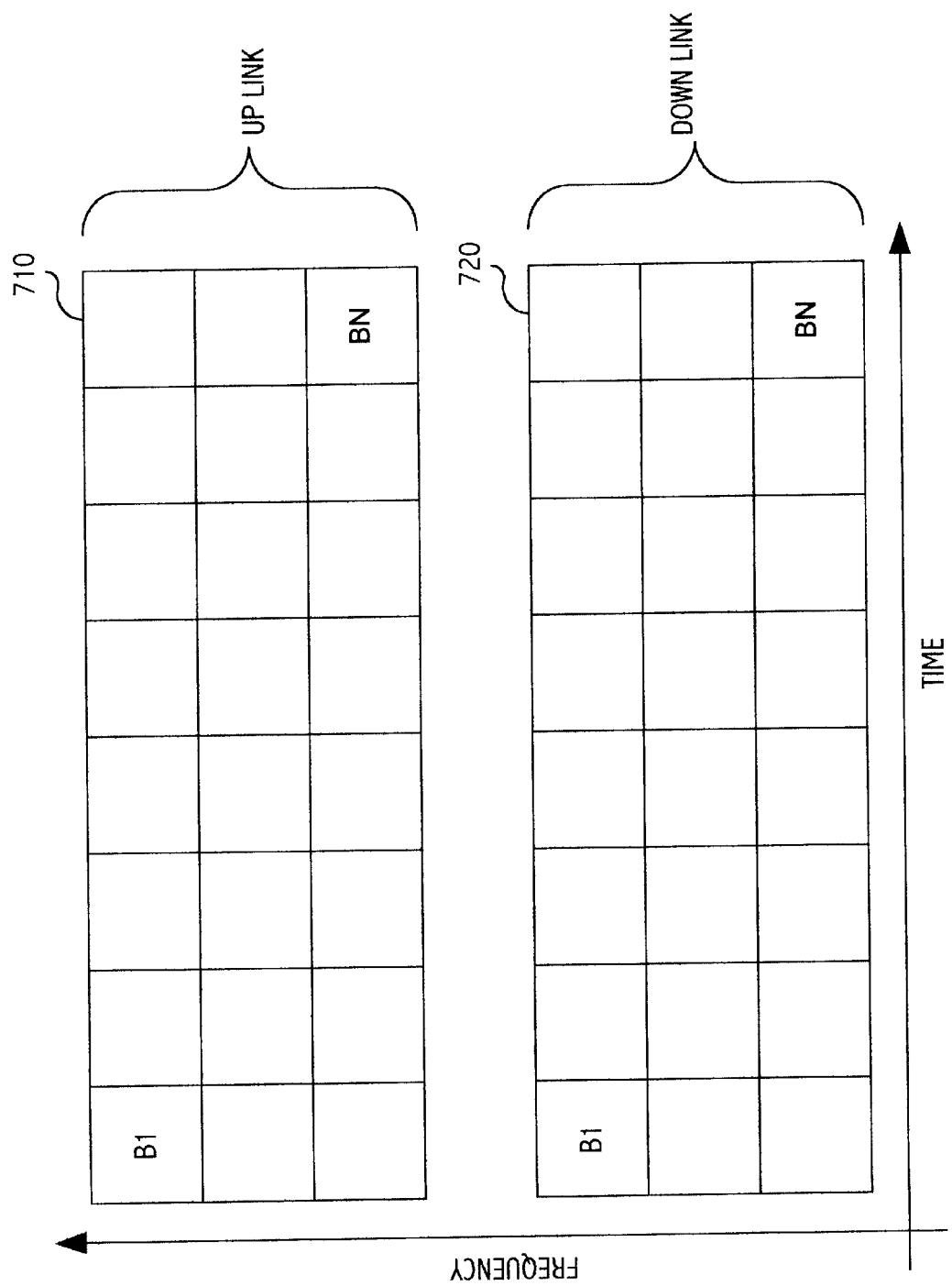
FIG. 7B shows a frame structure that includes an up link map transmitted at one frequency band, and a down link map transmitted at another frequency band.

FIG. 7B shows two maps 710, 720. A first map 710 can be designated as the up link map, and a second map 720 can be designated as the down link map. As shown in FIG. 7B, the up link map 710 occupies a different frequency band than the down link map 720. As described before, the maps include a finite number of frequency blocks and time slots. The maps 710, 720 of FIG. 7B are consistent with FDD transmission.

FIG. 7C also shows two maps 730, 740. A first map 730 can be designated as the up link map, and a second map 740 can be designated as the down link map. As shown in FIG. 7C, the up link map 730 occupies a different time duration than the down link map 740. As described before, the maps include a finite number of frequency blocks and time slots. The maps 730, 740 of FIG. 7C are consistent with TDD transmission.

Service Flow Request Table

FIG. 8 shows an example of a service flow table. The service flow table depicts information about each service flow request that is useful in generating the data block transmission schedule. The information included within the service flow table includes a service flow request identification number ($SF_1$, $SF_2$, $SF_3$, $SF_N$), a service flow queue size ($SFQ_1$, $SFQ_2$, $SFQ_3$, $SFQ_N$), a mode assignment ($M_1$, $M_2$, $M_3$, $M_N$) a block weight ($BW_1$, $BW_2$, $BW_3$, $BW_N$), and system mode (SM, Diversity).

The service flow request identification number identifies each individual service flow request.

The service flow queue size provides information regarding the size or amount of information being requested by the service flow request.

The mode assignment provides information regarding the type of modulation and coding to be used when providing the data blocks of the service flow request. The mode assignment is generally determined by quality of the transmission link between the base station transceiver and the subscriber units. The quality of the transmission link can be determined in many different ways.

The transmission quality of the links between a subscriber unit and the base transceiver stations can be determined several different ways. A cyclic redundancy check (CRC) failure rate can be monitored. The higher the quality of the link, the lower the CRC failure rates. The monitoring of CRC failure rates of steams of symbols is well known in the field of communications.

A signal to interference of noise ratio (SINR) monitoring can also be used to determine the quality of the transmission links. Various techniques as are well known in the field of communications can be used to determine the SINR.

Based on the quality of the link between a base station transceiver and a subscriber unit, a transmission mode is assigned to the subscriber unit. As previously mentioned, the transmission mode determines the coding and modulation used in the transmission of data between the base station transceiver and a subscriber unit. The better the quality of the transmission link, the greater the amount of information that can be transmitted. For example, the better the quality of the link, the greater the allowable order of modulation. That is, 16 QAM generally requires a better transmission link than 4 QAM.

A poor quality link can require the transmitted data to be coded to minimize the error rate of the transmitted data. Generally, coding of the transmitted information reduces the rate the data is transmitted because the coding adds additional coding data. Examples of the types of coding used include convolutional coding and Reed Solomen coding. These common types of coding are well known in the field of communications.

The mode assignment can also determinations of other transmission characteristics. For example, the mode assignment can also be used for specifying transmission frequency bandwidth or transmission power.

The block weight determines the minimum number of previously described blocks that are allocated to a service flow request at a time. The block weight is generally determined according to the priority of the data being requested. That is, certain types of service flow requests are for higher priority information. By allocating a larger block weight, the service flow request will be satisfied more quickly.

For a service request having a block weight of two, for example, the mapping of the schedule will allocate two successive blocks to the service request. A larger block weight will cause a larger number of blocks to be allocated to a service request.

The system mode determines whether the transmission of the data includes spatial multiplexing, diversity, or neither. Again, the quality of the transmission link between the base station transceiver and the subscriber units generally determines whether the transmission should include spatial multiplexing or diversity.

Figure 9:
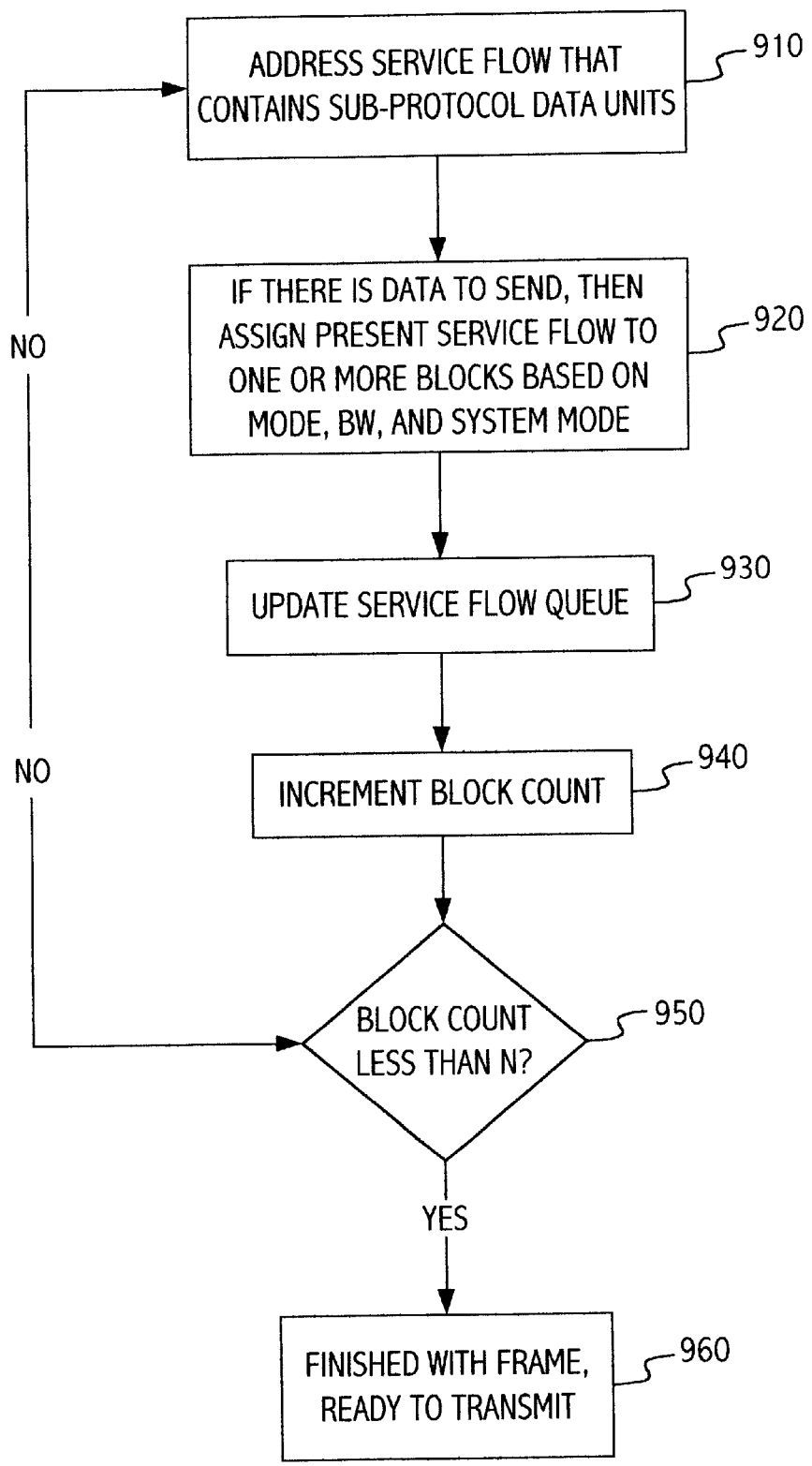
FIG. 9 shows a flow chart of steps included within an embodiment of a scheduler according to the invention.

FIG. 9 shows a flow chart of steps included within an embodiment of a scheduler according to the invention. As previously mentioned, the scheduler assigns time slots and frequency blocks in which sub-protocol data units are to be received by particular subscriber units. A schedule is generated once per a frame unit of time. A predetermined number of data blocks are included within a frame. Generally, the scheduler includes a weighted round robin assignment methodology.

The scheduler is generally implemented in software that runs on the controller within the base transceiver station. The controller is generally electronically connected to the MAC adaptation unit, the sub-protocol data buffers and the framing unit.

A first step 910 includes addressing a service flow request.

A second step 920 includes whether the present service flow request includes data to be sent. If data is to be sent, then the scheduler assigns the present service flow request to one or more data blocks based on the mode, block weight and system mode.

A third step 930 includes updating the service flow queue. That is, sub-protocol data units have been assigned to data blocks, then the service flow queue should be updated to reflect the assignment.

A fourth step 940 includes incrementing a block count. As previously mentioned, the mapping of a schedule only occurs once per frame. Each frame generally includes a predetermined number of frequency blocks and time slots. The block count begins when creating a map of a schedule. As service flow requests are addressed, a block counter is incremented. Note that the block weight will factor into the block count.

A fifth step 950 includes checking whether the block count is equal to the predetermined number N. If the block count has reached the predetermined number, then all of the blocks within the present frame have been assigned. If the block count is less than the predetermined number N, then more blocks within the frame can be assigned sub-protocol data units.

A sixth step is executed once all of the blocks within a frame have been assigned. The mapped schedule of the frame can then be sent.

Transmission Modes

Figure 10:
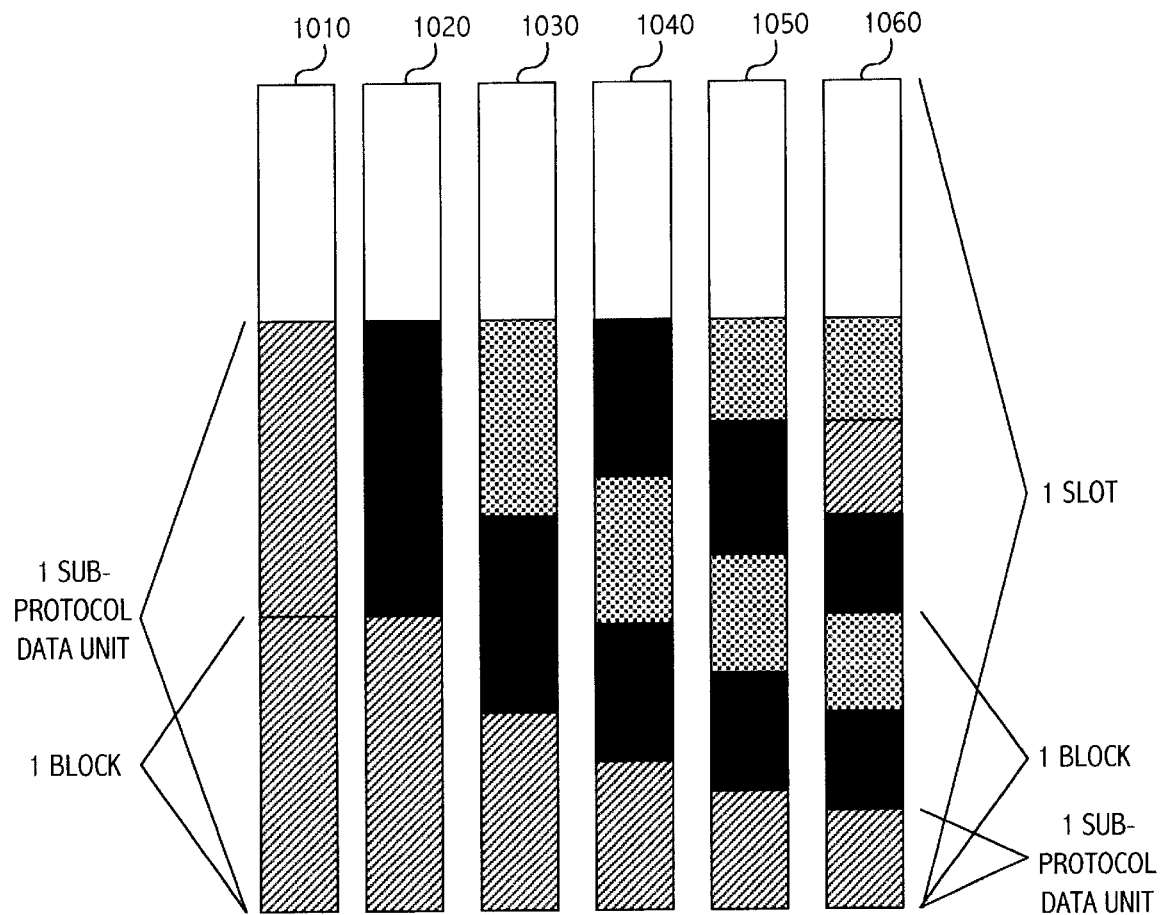
FIG. 10 depicts several modes of block transmission according to the invention.

FIG. 10 depicts several modes of block transmission according to the invention. The mode selection is generally based upon the quality of the transmission link between the base station transceiver and the subscriber units. The mode selection can determine the type of modulation (for example, 4 QAM, 16 QAM or 64 QAM), the type of coding (convolution or Reed Solomon), or whether the transmission includes spatial multiplexing or diversity.

As previously stated, several transmission link parameters can be used to establish the mode associated with the transmission of a sub-protocol data unit requested by a service flow. FIG. 10 depicts a relationship between a transmission data block (defined by a frequency block and time slot) and sub-protocol data unit according to an embodiment of the invention.

FIG. 10 shows a single time slot that is divided into three data block for six different modes. A first mode 1010 includes a sub-protocol data unit occupying two data blocks. A second mode 1020 includes a sub-protocol data unit occupying a single data block. A third mode 1030 includes three sub-protocol data units occupying two data blocks. A fourth mode 1040 includes two sub-protocol data units occupying one data block. A fifth mode 1050 includes five sub-protocol data units occupying two data blocks. A sixth mode 1060 includes three sub-protocol data units occupying a single data block.

As previously stated, the mode assignment determines the amount of information transmitted within each data block. Generally, the better the quality of the transmission link between a base transceiver station and a subscriber unit, the higher the mode assignment, and the greater the amount of information transmitted per data block.

It should be understood that the mode assignment of transmission links between base transceiver stations and subscriber units can vary from subscriber unit to subscriber unit. It should also be understood that the mode assignment of a transmission link between a base transceiver station and a subscriber unit can change from time frame to time frame.

It is to be understood that the number of frequency blocks allocated per time slot is variable. An embodiment of the scheduler includes the scheduler taking into consideration constraints on the frequency bandwidth on either the up link or the down link transmission. The frequency bandwidth allocations can be adjusted by varying the number of frequency blocks within a time slot. The frequency bandwidth allocated to a subscriber can be limited due to signal to noise issues, or the Federal Communication Committee (FCC) limitations. The scheduler can account for these limitations though allocations of frequency bandwidth through the scheduling.

Figure 11:
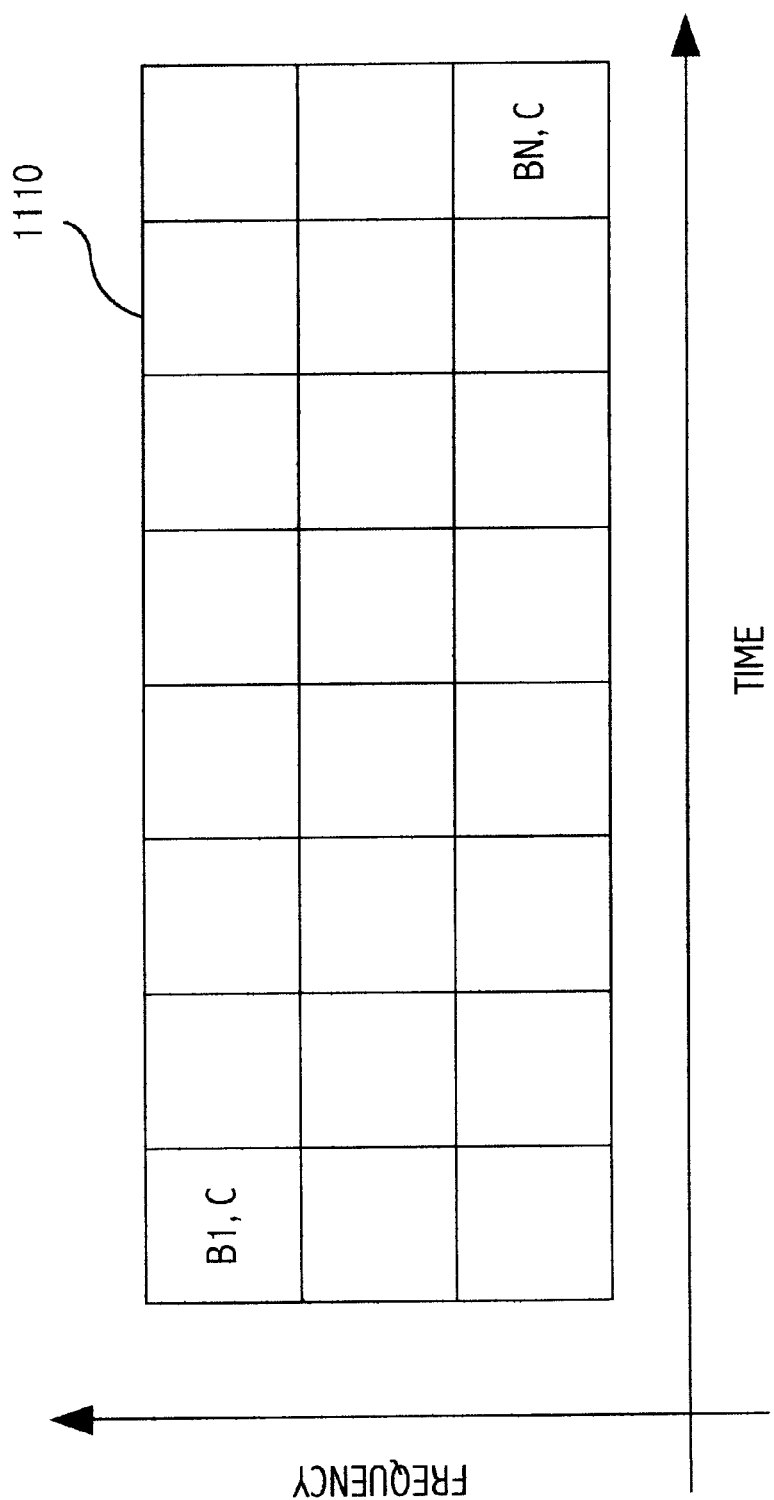
FIG. 11 shows a frame structure that includes a code that distinguishes the blocks of the frame from blocks of other frames having a different code, thereby providing code division multiple access (CDMA).

The description of the invention has been limited to FDMA and TDMA. However, it is to be understood that the principles and concepts of the invention can be extended to include CDMA. FIG. 11 shows a frame structure that includes a code that distinguishes the blocks of the frame from blocks of other frames having a different code, thereby providing code division multiple access (CDMA).

FIG. 11 shows a frame 1110 that includes blocks B1, C through BN, C. The C attached to each block indicates that each block is coded according to the frame the block belongs. Other frames can include blocks having the same frequency ranges and time slots. Multiple access of the blocks can be accomplished by coding the blocks of different frames differently. CDMA can be used for both for down link and up link block transmission.

Sleep and Paging Modes

The subscriber units can be configured to include a sleep or paging mode. In the sleep mode, the subscriber units that are not scheduled to receive or transmit data units, power down to save power. That is, if the map schedule of a frame does not include transmission between any base transceiver station and a subscriber unit, the subscriber unit powers down for that particular frame. Therefore, the subscriber unit requires less power. A paging mode extends the power down period to multiple frames. In paging mode, a subscriber unit only powers up when a request for transmission of data is received. The request can be received at particular points in time, for example, when synchronization signals are received by the subscribers from the base transceiver stations.

Data Block Headers

As previously mentioned, the map of the schedule of each frame is transmitted to all subscriber units at the beginning of the transmission of a frame. Additionally, the service flow identification and mode selection for each frequency block and time slot is generally transmitted within the map.

Figure 12:
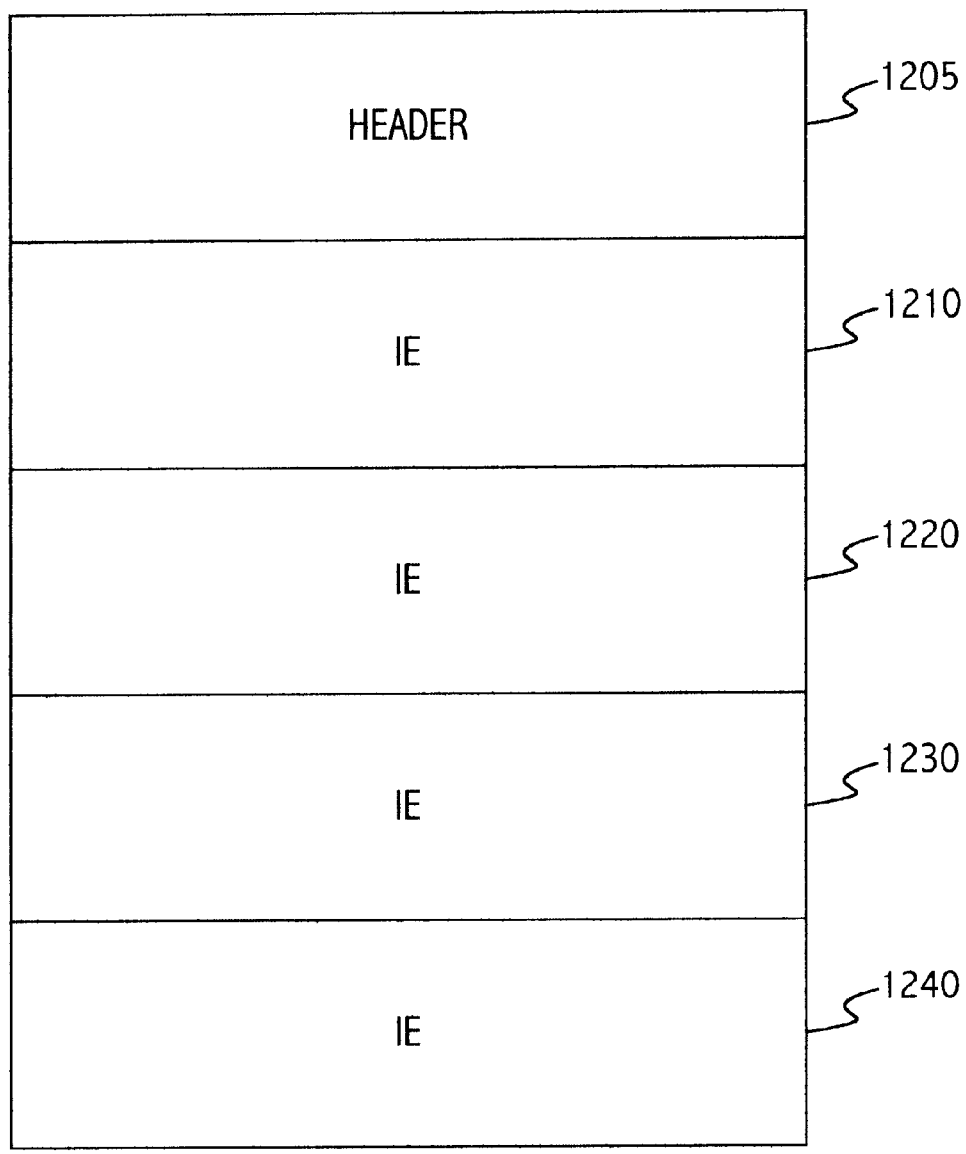
FIG. 12 shows a structure of a map message that is sent once per frame.

FIG. 12 shows a structure of a map message that is sent once per frame. The map message includes a header 1205, and information elements (IE's) 1210, 1220, 1230, 1240. The header includes the number of the associated frame. The IE's 1210, 1220, 1230, 1240 include a service flow identification, a mode number, the number of blocks associated with the service flow identification, and information indicating whether the service flow is up link or down link.

Although specific embodiments of the invention have been described and illustrated, the invention is not to be limited to the specific forms or arrangements of parts so described and illustrated. The invention is limited only by the appended claims.

What is claimed:

1. A method for transmitting data streams between a base transceiver station and a subscriber, the base station comprising a plurality of base station transceiver antennas, the method comprising:
   receiving protocol data units from a network;
   creating sub-protocol data units from the protocol data units;
   selecting a transmission scheme that includes at least one of spatial multiplexing and transmission diversity, based upon a transmission link quality between each base station transceiver antenna and the subscriber unit; and
   once per frame of time, generating a schedule according to the selected transmission scheme, that designates time slots and pre-defined frequency blocks in which the subscriber is to receive each of the sub-protocol data units from the plurality of base station transceiver antennas.

2. The method of transmitting data streams between a base transceiver station and a subscriber of claim 1, further comprising:
   transmitting the schedule to the subscriber; and
   the plurality of base station transceiver antennas transmitting the sub-protocol data units according to the schedule.

3. The method of transmitting data streams between a base transceiver station and a subscriber of claim 1, further comprising:
   storing the sub-protocol data units in sub-protocol buffers; and
   accessing the sub-protocol data units from the sub-protocol buffers according to the schedule.

4. The method of transmitting data streams between a base transceiver station and a subscriber of claim 1, wherein generating a schedule that designates time slots and pre-defined frequency blocks comprises:
   selecting at least one transmission mode for the subscriber by determining a quality of transmission links between the base station transceiver and the subscriber.

5. The method of transmitting data streams between a base transceiver station and a subscriber of claim 1, wherein generating a schedule that designates time slots and pre-defined frequency blocks comprises:
   selecting at least one transmission mode for the subscriber determined by quality of service demanded by the subscriber.

6. The method of transmitting data streams between a base transceiver station and a subscriber of claim 4, wherein selecting a transmission mode comprises:
   determining how data within the sub-protocol units is coded.

7. The method of transmitting data streams between a base transceiver station and a subscriber of claim 4, wherein selecting a transmission mode comprises:
   determining a modulation type to be used to transmit the sub-protocol data units.

8. The method of transmitting data streams between a base transceiver station and a subscriber of claim 1, wherein generating a schedule that designates time slots and pre-defined frequency blocks comprises:
   receiving an information size requested by the subscriber.

9. The method of transmitting data streams between a base transceiver station and a subscriber of claim 1, further comprising a plurality of subscribers, and wherein generating a schedule that designates time slots and pre-defined frequency blocks comprises:
   receiving a block weight from each of the subscribers, wherein the block weight is dependent upon the priority of a service flow request from the subscriber.

10. The method of transmitting data streams between a base transceiver station and a subscriber of claim 9, wherein the block weight determines how many consecutive time slots and frequency blocks are transmitted to each subscriber.

11. The method of transmitting data streams between a base transceiver station and a subscriber of claim 1, further comprising a plurality of subscribers, wherein generating a schedule that designates time slots and pre-defined frequency blocks comprises:
   receiving service flow requests from the subscribers, the service flow requests indicating demands for data by the subscribers.

12. The method of transmitting data streams between a base transceiver station and a subscriber of claim 1, further comprising a plurality of subscribers, and wherein generating a schedule that designates time slots and pre-defined frequency blocks comprises:
   mapping time slots and frequency blocks with subscribers based upon a weighted round-robin selection scheme, wherein the weighting is based upon at least one of:
   a transmission mode, an information size, a block weight and a service flow request.

13. The method of transmitting data streams between a base transceiver station and a subscriber of claim of claim 4, wherein determining the quality of transmission links between the base station transceiver and the subscriber comprises:

training transmission channels between the base station transceiver and the subscriber.

14. The method of transmitting data streams between a base transceiver station and a subscriber of claim 1, wherein generating a schedule according to the selected transmission scheme, that designates time slots and pre-defined frequency blocks in which the subscriber is to receive each of the sub-protocol data units from the plurality of base station transceiver antennas comprises:

scheduling transmission of sub-protocol data units so that at least one base station transceiver antenna transmits a different sub-protocol data unit than another base station transceiver antenna during a same time slot and frequency block.

15. The method of transmitting data streams between a base transceiver station and a subscriber of claim 1, wherein generating a schedule according to the selected transmission scheme, that designates time slots and pre-defined frequency blocks in which the subscriber is to receive each of the sub-protocol data units from the plurality of base station transceiver antennas comprises:

scheduling transmission of sub-protocol data units so that at least one base station transceiver antenna transmits a same sub-protocol data unit as another base station transceiver antenna during a same time slot and frequency block.

16. The method of transmitting data streams between a base transceiver station and a subscriber of claim 4, wherein the number of sub-protocol data units that are transmitted within a frequency block is determined by the transmission mode.

17. The method of transmitting data streams between a base transceiver station and a subscriber of claim 1, wherein a time duration of the time slots is determined by a frame duration and a number of time slots within the frame duration.

18. The method of transmitting data streams between a base transceiver station and a subscriber of claim 1, wherein when the subscriber unit is not scheduled to receive or transmit sub-protocol data units for a given frame, the subscriber unit is powered down for that frame.

19. The method of transmitting data streams between a base transceiver station and a subscriber of claim 1, wherein a frequency bandwidth of the frequency blocks is determined by an available transmission frequency bandwidth and a total number of frequency blocks simultaneously transmitted.

20. The method of transmitting data streams between a base transceiver station and a subscriber of claim 1, wherein the plurality of base station transceiver antennas are physically located at a single base station transceiver.

21. The method of transmitting data streams between a base transceiver station and a subscriber of claim 1, wherein the subscriber comprises a plurality of subscriber antennas.

22. The method of transmitting data streams between a base transceiver station and a subscriber of claim 1, wherein at least one of the schedules is for down link transmission.

23. The method of transmitting data streams between a base transceiver station and a subscriber of claim 1, wherein at least one of the schedules is for up link transmission.

24. A method for transmitting data streams between a base transceiver station and a subscriber, the method comprising:

receiving protocol data units from a network;

creating sub-protocol data units from the protocol data units;

selecting a transmission scheme for each subscriber that includes at least one of spatial multiplexing and transmission diversity, based upon a transmission link quality between each base station transceiver antenna and the subscriber unit; and once per frame of time, generating a schedule according to the selected transmission schemes that designates time slots and pre-defined frequency blocks in which the subscriber is to receive each of the sub-protocol data units from the base station transceiver, wherein generating a schedule comprises selecting at least one transmission mode the subscriber by determining a quality of transmission links between the base station transceiver and the subscriber;

transmitting the schedule to the subscriber; and the base station transceiver transmitting the sub-protocol data units according to the schedule.

25. The method of transmitting data streams between a base transceiver station and a subscriber of claim 24, wherein generating a schedule that designates time slots and pre-defined frequency blocks comprises:

selecting at least one transmission mode for a subscriber is determined by quality of service demanded by the subscriber.

26. A base station transceiver for transmitting data streams to a subscriber, the base station transceiver comprising:

an adaptation unit for creating sub-protocol data units from protocol data units received from a network;

means for selecting a transmission scheme that includes at least one of spatial multiplexing and transmission diversity, based upon a transmission link quality between each base station transceiver antenna and the subscriber unit; and a scheduler generating a map of a schedule according to the selected transmission scheme, that designates time slots and pre-defined frequency blocks in which the plurality of subscriber is to receive each of the sub-protocol data units from a plurality of base station transceiver antennas.

27. The base station transceiver for transmitting data to a subscriber of claim 26, further comprising:

means for transmitting the map schedule to the subscriber; and the base station transceiver transmitting the sub-protocol data units according to the map schedule.

28. The base station transceiver for transmitting data streams to a subscriber of claim 27, further comprising:

sub-protocol buffers for storing the sub-protocol data, the scheduler connected to the sub-protocol buffers providing access to the sub-protocol data units according to the map schedule.

29. The base station transceiver for transmitting data streams to a subscriber of claim 28, wherein the scheduler selects at least one transmission mode for the subscriber by determining the quality of transmission links between the base station transceiver and the subscriber.

30. A base station transceiver for transmitting data streams to a subscriber of claim 28, wherein the scheduler selects at least one transmission mode for the subscriber by determining a quality of service demanded by the subscriber.

31. A base station transceiver for transmitting data streams to a subscriber, the base station transceiver comprising:

an adaptation unit for creating sub-protocol data units from protocol data units received from a network;

means for selecting a transmission scheme that includes at least one of spatial multiplexing and transmission diversity, based upon a transmission link quality between each base station transceiver antenna and the subscriber unit; and a scheduler for generating a map of a schedule according to the selected transmission scheme that designates time slots and pre-defined frequency blocks in which the subscriber is to receive each of the sub-protocol data units from the base station transceiver, wherein generating the map comprises selecting at least one transmission mode for the subscriber by determining a quality of transmission links between the base station transceiver and the subscriber;

means for transmitting the map and the schedule to the subscriber; and the base station transceiver transmitting the sub-protocol data units according to the schedule.

32. The base station transceiver for transmitting data streams to a subscriber of claim 31, wherein the scheduler selects at least one transmission mode for the subscriber, the transmission mode being determined by a quality of service demanded by the subscriber.

33. A method for transmitting data streams between a plurality of base transceiver stations and a subscriber, each base transceiver station comprising at least one base station transceiver antenna, the method comprising:

each base transceiver station receiving protocol data units from a network;

each base transceiver station creating sub-protocol data units from the protocol data units;

each base transceiver station selecting a transmission scheme that includes at least one of spatial multiplexing and transmission diversity, based upon a transmission link quality between each base station transceiver antenna and the subscriber unit; and once per frame of time, generating a schedule according to the selected transmission scheme, that designates time slots and pre-defined frequency blocks in which the subscriber is to receive each of the sub-protocol data units from the base station transceiver antennas.

* * * * *